(12) United States Patent
Walsh

(10) Patent No.: US 6,348,981 B1
(45) Date of Patent: Feb. 19, 2002

(54) SCANNING SYSTEM AND METHOD FOR STITCHING OVERLAPPED IMAGE DATA

(75) Inventor: John F. Walsh, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/232,636

(22) Filed: Jan. 19, 1999

(51) Int. Cl.[7] ................................................ H04N 1/04
(52) U.S. Cl. .................................... 358/474; 250/208.1
(58) Field of Search ................................. 358/474, 482, 358/483, 213.13; 250/578, 204

(56) References Cited

U.S. PATENT DOCUMENTS

| | | | |
|---|---|---|---|
| 4,631,598 A | 12/1986 | Burkhardt et al. | 358/280 |
| 4,972,273 A | 11/1990 | Burkhardt et al. | 358/443 |
| 5,144,448 A | * 9/1992 | Hornbaker | 358/213.13 |
| 5,532,845 A | 7/1996 | Gusmano | 358/474 |
| 6,009,190 A | * 12/1999 | Szeliski | 382/154 |

* cited by examiner

*Primary Examiner*—Jerome Grant, II
*Assistant Examiner*—Negussie Worku
(74) *Attorney, Agent, or Firm*—Oliff & Berridge PLC

(57) ABSTRACT

A multi-scanning system or image processing system includes a plurality of sensors, each of the sensors scanning a portion of the document to produce image data. Each of the sensors overlaps adjacent ones of the sensors so that the image data includes overlapped image data. The image data from the sensors is stitched together to form a complete image. The stitching may be performed by a weighted averaging of the data or by varying stitch location within the data. This stitching is useful in eliminating visible image defects created the misalignment of pixels between adjacent sensors.

20 Claims, 5 Drawing Sheets

SCANNING SYSTEM AND METHOD FOR STITCHING OVERLAPPED IMAGE DATA

BACKGROUND OF THE INVENTION

1. Field of Invention

The present invention is directed to a scanning system and image processing system and methods thereof for stitching together overlapped image data. More specifically the present invention is directed to such systems and methods that produce such overlapped image data from a plurality of overlapped sensors and stitch the overlapped image data together.

2. Description of Related Art

Modern fall-width scanning systems typically use a system where a document to be scanned is stationary and the scanning system moves. A single mobile carriage is typically utilized to scan the entire document. The carriage system, conventionally, includes a fall-width sensor array system and a light source. The sensor array system may be a CCD array that receives light reflected from the document and converts the light into electrical signals representing the intensity of the received light. The electrical signals are then passed on to an electronic subsystem which typically includes a controller that performs the necessary image processing operations to prepare the image data either for display on display devices such as a CRT, for storage on a storage device, or for recording or printing on a medium such as a document, if the system is part of a copier.

Another example of a scanning system is a constant velocity transport (CVT) scanning system where the document moves and the scanning system is stationary. In the CVT scanning system, a single stationary scanning system is utilized to scan the entire document, wherein the document is moved past the scanning system. This type of scanning system, conventionally, includes a full-width CCD sensor array system and a light source. As in the fall-width scanning system described above, a CVT scanning system has the full-width CCD sensor array receive light reflected from the document and it converts the light into electrical signals representing the intensity of the received light. Electrical signals are then passed on to an electronic subsystem controller which performs the necessary image processing operation so as to prepare the image data either for display, storage or recording as described above.

Conventional scanning systems may utilize multiple sensors, or sensor arrays, to create a full-width scanning system. Typically, such a scanning system may include a plurality of sensors that are overlapped with each other, to provide a fall-width scan. These types of scanning systems have typically switched from one sensor to the next in the middle of the scanned line. However, because the individual pixels are very small, the pixels in the overlapping regions of the sensors are typically not precisely aligned from one sensor to the next. This pixel separation causes image defects, which are especially evident for halftone patterns in an original document that straddles the region where the sensors are overlapped and the system will switch from one sensor to another.

The conventional scanning systems have stitching circuits that typically simply switch from a first sensor (or channel) to a second sensor at some point in the overlapped region. For example, U.S. Pat. No. 5,532,845, assigned to the same assignee as the present application, and which is incorporated herein by reference in its entirety, discloses a digital scanner that includes a stitching circuit for putting two channels of image data together. This stitching circuit switches from the first channel to the second channel when it processes the overlapped scan lines using conventional stitching methods. This system does not account for a misalignment of pixels from by one sensor to the next in the overlapped region.

SUMMARY OF THE INVENTION

One aspect of the present invention is a multi-sensor scanning system or image processing system which includes a plurality of sensors each scanning a portion of a document to produce image data. Each of the sensors overlap adjacent sensors and the sensors thus produce overlapped image data. The image data is stitched together to form a complete image by performing a weighted averaging over the overlapped image data. The weighted averaging may be linear or non-linear.

Another aspect of the present invention is a scanning system or image processing system that includes a plurality of sensors, with each of the sensors scanning a portion of the document to produce image data. Each of the sensors overlap adjacent sensors so that the image data includes overlapped image data. The image data from the sensors is stitched together to form a compete image by varying a stitch location within the overlapped image data. A stitch location may be varied from scanline to scanline in the slowscan direction.

A more complete understanding of the present invention can be obtained by considering the following detailed description in conjunction with the accompanying drawings, wherein like index numerals indicate like parts.

DETAILED DESCRIPTION OF PREFERRED EMBODIMENTS

Figure 1:
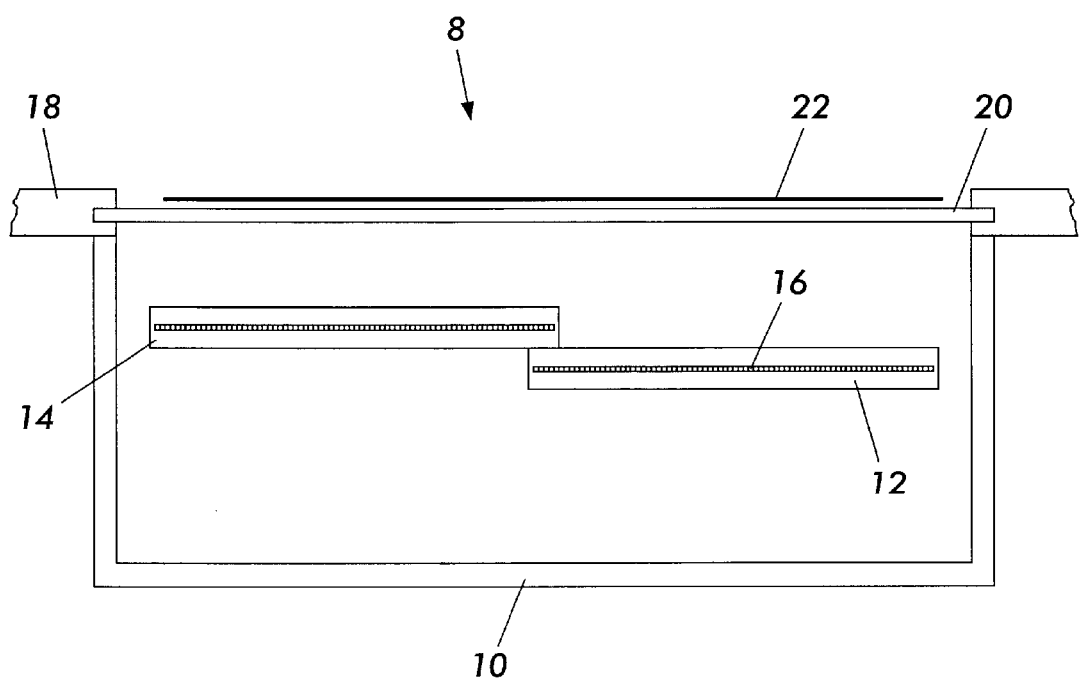
FIG. 1 is an illustration of overlapped sensors in a scanning or image processing system according to an embodiment of the present invention.

FIG. 1 illustrates a scanning system or an image processing system of a preferred embodiment of the present invention. The scanning or image processing system may be part of a copier, scanner or other image processing system. The scanning system includes a platen support 18 which supports a platen glass 20 upon which a document 22 is placed. The document 22 is scanned by a single carriage assembly 10, which in the embodiment shown in the figure includes two sensors 12 and 14 each of which include a large number of pixels 16. Each sensor may include, for example, five thousand pixels, although other numbers of pixels per sensor may be used. As may be seen with reference to FIG. 1, the sensors 12 and 14 may be overlapped with a certain number of pixels overlapping pixels from the adjacent sensor.

Any number of overlapped sensors may be used in this manner. A preferred embodiment may use three overlapped sensors each having five thousand pixels. Such a three sensor scanner may be useful in an engineering scanner that may have a fast scan scanwidth of, for example, 36 inches. The system may use a certain number of pixels at the end of each sensor for registration purposes, although a system of the invention may dispense with these registration pixels. For example, a preferred embodiment of the system may use one hundred of the pixels at each end of the sensor for registration purposes. In addition, a certain number of non-registration pixels in each of the sensors 12 and 14 will overlap each other in the central area where the two sensors overlap. The system of the present invention takes image data from each of the overlapped non-registration pixels and stitches the image data together in the overlapped areas to form a complete image, as will be further described below.

Figure 2:
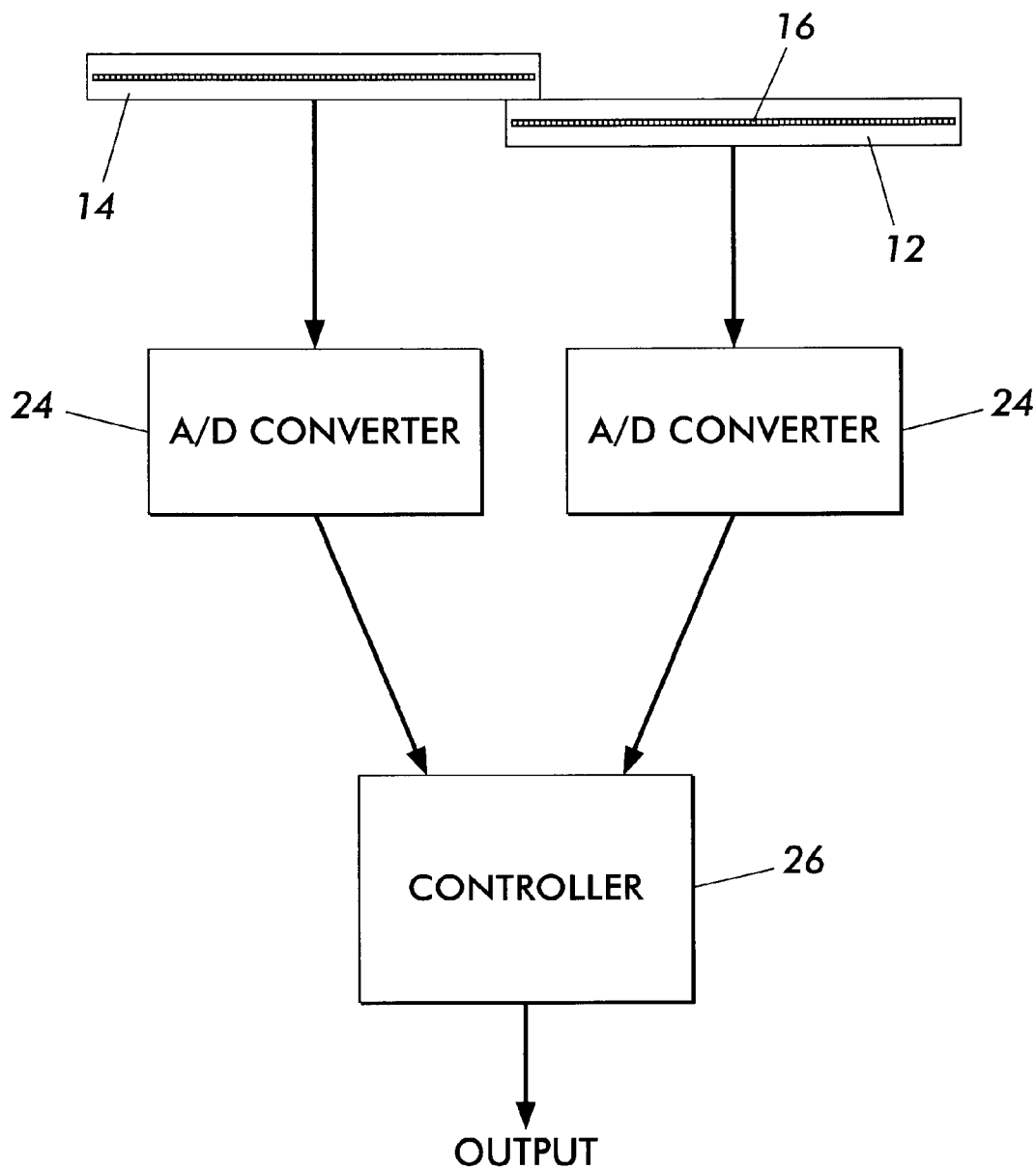
FIG. 2 is an illustration of a scanning or image processing system according to an embodiment of the present invention.

FIG. 2 illustrates further details of the electronics used in the system of the present invention. As shown in FIG. 2, the sensors 14 and 16 are connected to a A/D converters 24, which receive analog image data from the sensors and convert it to digital image data. This digital image data is then fed to controller 26, which performs the necessary image processing to stitch the image data together in the area of the overlap. The controller 26 then outputs the complete image data, as further described below.

Figure 4:
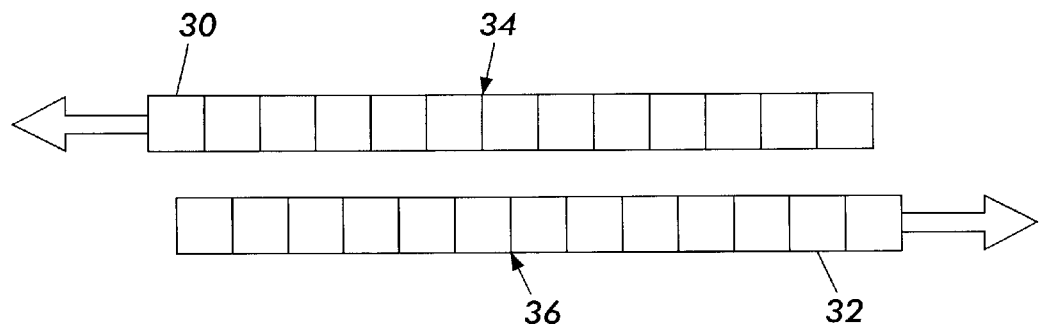
FIG. 4 is an illustration of overlapped pixels in two sensors of a preferred embodiment of the present invention.
Figure 5:
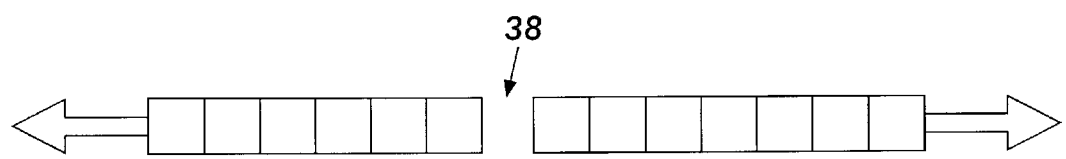
FIG. 5 is an illustration of one scanline of image produced without the weighted averaging of the present invention.

FIG. 4 illustrates twelve individual pixels from two overlapped image sensors. In particular, the pixels 30 may be from a first image sensor, such as sensor 14, and the pixels 32 may be from a second sensor, such as sensor 16. The arrows at the end of each of the pixels 30 and 32 indicate additional pixels would extend in the direction of the arrow for the corresponding sensor. As may be seen with reference to FIG. 4, these overlapped pixels are misaligned in a vertical direction. In conventional systems, a stitching circuit was employed that would switch from a first one of the image sensors to a second one of the image sensors at some point in the overlap region, selecting pixels from the first image sensor at this point and selecting pixels from the second image sensor after this point. For example, the pixels 30 from the first image sensor could be selected up until point 34 and the pixels 32 from the second image sensor could be selected starting at the point 36, which would yield pixels forming an image as shown in prior art FIG. 5. Because of the misalignment of the pixels, a gap of missing image data would be formed when switching from a first sensor to the second sensor due to this misalignment. This gap is illustrated in FIG. 5 as element 38. By repeatedly scanning with the overlapped sensors, individual scanlines would be formed, such as scanlines 40 shown in FIG. 7. A gap of missing image data similar to the gap 38 shown in FIG. 5 would be formed in each of the scanlines, resulting in a gap 42 formed in the image at a location corresponding to a position where a stitching circuit switches from a first overlapped sensor to a second overlapped sensor. This gap 42 of missing image data would be formed on the entire image, resulting in a visible image defect, especially if the gap of missing image data occurs at a point in the image where the brightness or gray level is changing quickly.

If more than two overlapped sensors were used, then more than one gap in image data would be formed in the image. For example, if three sensors are used, then two gaps would be formed, in the location corresponding to each of the positions where the sensors are overlapped where the system switches from image data from one sensor to image data from another sensor. These gaps result in undesirable image defects due to the quickly changing brightness levels.

Figure 6:
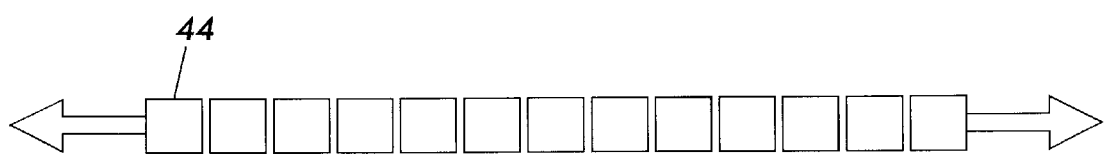
FIG. 6 is an illustration of one scanline of image produced with the weighted averaging of the invention.

The present invention includes embodiments utilizing several ways of eliminating these undesirable image defects. For example, a first embodiment of the present invention utilizes an apparatus and method that averages positions of corresponding pixels of the two overlapped sensors in the overlapped area, gradually shifting the image source from one sensor to the other, to spread out the above-described gap and residual defects created thereby. The positions and brightness of pixels from the sensors in the overlapped area are averaged. In particular, the system of this embodiment will spread out the stitch location to minimize the impact of the above-described defect. Pixels 44 shown in FIG. 6 are the resultant pixels that were produced by this embodiment of the invention, which have the gap 38 shown in FIG. 5 spread out to eliminate the visual defect. The following notations are now introduced for convenience. First, SP (sensor #, pixel #) describes the source pixel SP from the overlapped sensors that will produce the resultant pixel RP pixel #) that will be used to produce an image. For example, in the prior art embodiment shown in FIG. 5, if each sensor has five thousand pixels, and one hundred pixels at the end of each sensor are used for registration, then the following could illustrate a three sensor system;

$RP(0)=SP(1,100)$ $RP(1)=SP(1,101)$

. . .

$RP(4799)=SP(1,4899)$ $RP(4800)=SP(2,100)$ $RP(4801)=SP(2,101)$

. . .

$RP(9599)=SP(2,4899)$ $RP(9600)=SP(3,100)$ $RP(9601)=SP(3,101)$

. . .

$RP(14399)=SP(3,4899)$

The first line of this data shows that resultant pixel 0 would be the $100^{th}$ pixel from the first sensor. Pixels 0 to 99 are used for registration purposes as described above. Resultant pixel 4799 would be the $4899^{th}$ pixel from the first sensor. The $4800^{th}$ resultant pixel would be the $100^{th}$ pixel from the second sensor. Pixels 4900 to 4999 may also be used for registration. Before the $4800^{th}$ resultant pixel would be the gap 38 illustrated in FIG. 5. If the sensors were perfectly aligned, this would not result in a gap in image data such as the gap 38 shown in FIG. 5. However, because this very precise alignment of pixels from one sensor to another is extremely difficult, the present invention uses the weighted averaging method set forth in the example described below to compensate for the misalignment of the sensors, as shown in FIG. 4. This example of weighted averaging is shown below.

$RP(0)=SP(1,100)$ $RP(1)=SP(1,101)$

...

$RP(4795)=SP(1,4895)$ $RP(4796)=SP(1,4896)*0.9+SP(2,96)*0.1$ $RP(4797)=SP(1,4897)*0.8+SP(2,97)*0.2$ $RP(4798)=SP(1,4898)*0.7+SP(2,98)*0.3$ $RP(4799)=SP(1,4899)*0.6+SP(2,99)*0.4$ $RP(4800)=SP(1,4900)*0.5+SP(2,100)*0.5$ $RP(4801)=SP(1,4901)*0.4+SP(2,101)*0.6$ $RP(4802)=SP(1,4902)*0.3+SP(2,102)*0.7$ $RP(4803)=SP(1,4903)*0.2+SP(2,103)*0.8$ $RP(4804)=SP(1,4904)*0.1+SP(2,104)*0.9$ $RP(4805)=SP(2,105)$

...

This example shows a stitch region from resultant pixel RP(4796) to resultant pixel RP(4804). In particular, resultant pixel (4795) is generated by taking the position and brightness from the source pixel 4895 from the first sensor. The next resultant pixel RP(4796) starts the weighted averaging by multiplying source pixel (position and brightness) 4896 from the first bar times 0.9 and adding that to source pixel SP 96 from the second bar times 0.1, as may be seen in the fourth line of the above example. Further lines of this example show a linear weighted average gradually shifting the results from the first sensor to the second sensor. This allows the gap 38 shown in FIG. 5 to be spread evenly between the overlapping pixels to eliminate the image defect. The procedure may be applied to any desired number of overlapping sensors to eliminate the above-described image defect. Additionally, the linear nature of this averaging may be extended to more or less than 10 pixels and/or into pixel weighting schemes that vary in the non-linear fashion.

The position and brightness for each pixel can be described as (position, brightness) or (X, Y), where X is position and Y is brightness (or gray level). The X direction will be defined as the direction of the right pointing arrow in FIG. 5. The X position can be measured from any reference point, such as from a left side of the leftmost pixel to a defined position on the pixel of interest, such as a center of the pixel of interest.

If there is a large gap between two of the X values, especially when switching from one sensor to another, there may be a large difference between the corresponding Y values. When the resultant image is printed, the two X pixels that were far apart will be printed right next to each other. The corresponding large Y difference will cause an image quality defect that may be noticeable and objectionable to observers of the image. The weighted averaging of the invention prevents these defects.

By averaging the Y values that correspond to two X values, we determine what the Y value would have been half way in between the two X values.

Consider the following example:

A pixel at position $X_1$ senses a brightness $Y_1$:
$X_1$=1.000 inches
$Y_1$=174 brightness units A pixel at position $X_2$ senses a brightness $Y_2$:
$X_2$=1.004 inches
$Y_2$=178 brightness units Assume that we want to find the brightness of a pixel at position 1.002 inches (half way between $X_1$ and $X_2$) would be:

$$X_{Result}=(X_1+X_2)/2$$

Therefore:

$$Y_{Result}=(Y_1+Y_2)/2$$

Another way to write these same equations is:

$$X_{Result}=X_1*0.5+X_2*0.5$$

Therefore:

$$Y_{Result}=Y_1*0.5+Y_2*0.5$$

Plugging in the above values for $Y_1$ and $Y_2$:

$$Y_{Result} = 174*0.5 + 178*0.5$$
$$= 176$$

Therefore, assuming that we are in an image area of smooth brightness level transition, a pixel half way in between $X_1$ and $X_2$ would have a brightness value of approximately 176 brightness units. (The value is only approximate because we have specified only a smooth transition of brightness values, which is all that we can hope for in a real world image. The value would be exact if the brightness level transition were linear and if there were no quantization errors—errors caused by rounding in the analog to digital converter—involved in determining the known brightness values.)

If we want to determine what the pixel value would be at a position other than the position exactly in between two known pixels, we need to use weighted averaging.

Consider the following example:

Given the same values for $X_1$, $Y_1$, $X_2$ and $Y_2$ from the previous example, what would the gray level be at location 1.003 inches (three quarters of the way toward $X_2$ from $X_1$)?

$$X_{Result}=X_1*0.25+X_2*0.75$$

Therefore:

$$Y_{Result}Y_1*=0.25+Y_2*0.75$$

Plugging in the above values for $Y_1$ and $Y_2$:

$$Y_{Result} = 174*0.25 + 178*0.75$$
$$= 177$$

So, weighted averaging can be used to determine the brightness (Y) at any position (X) between two positions where the brightness is already known. This fact is used in this invention to determine the brightness level at a point between any two overlapping pixels, one from each bar.

Assume that the first bar has pixels located at 1.000 inches, 1.004 inches, 1.008 inches, 1.012 inches, and so on. Further assume that the second bar has pixels located at 1.002 inches, 1.006 inches, 1.010 inches, 1.014 inches, 1.018 inches, and so on.

We can use weighted averaging to determine the brightness level at positions 1.0045, 1.009, and 1.0135 inches, as follows:

$$X_{Result}=X_1*0.75+X_2*0.25$$

$$(1.0045=1.004*0.75+1.006*0.25)$$

Therefore:

$$Y_{Result}=Y_1*0.75+Y_2*0.25$$

$$Y_{at\ 1.0045}=Y_{at\ 1.004}*0.75+Y_{at\ 1.006}*0.25$$

Similarly:

$$X_{Result}=X_1*0.5+X_2*0.5$$

$$(1.009=1.008*0.5+1.010*0.5)$$

Therefore:

$$Y_{Result}=Y_1*0.5+Y_2*0.5$$

$$Y_{at\ 1.009}Y_{at\ 1.008}*0.5+Y_{at\ 1.010}*0.5$$

Finally:

$$X_{Result}=X_1*0.25+X_2*0.75$$

$$(1.0135=1.012*0.25+1.014*0.75)$$

Therefore:

$$Y_{Result}=Y_1*0.25+Y_2*0.75$$

$$Y_{at\ 1.0135}=Y_{at\ 1.012}*0.25+Y_{at\ 1.014}*0.75$$

The result is that we have four gaps that are 0.0005 inches wider than normal (0.0045 inches instead of 0.004 inches) as we transition between bars, instead of one gap that is 0.002 inches wider than normal (0.006 inches instead of 0.004 inches). As previously stated, the larger the gap is (relative to the gap between normal pixels), the larger the brightness level jump will be, relative to the brightness level jumps between normal pixels. A single large brightness jump would be much more noticeable to an image observer than several smaller jumps. The purpose of this invention is to produce an image with several small jumps instead of one large jump.

Finally, in these examples, a transition region of four pixels is used. Elsewhere in this application, ten pixel transition regions are used and other numbers may be used as desired. There are computational and image quality tradeoffs involved in the decision about how large the transition region should be.

Figure 3:
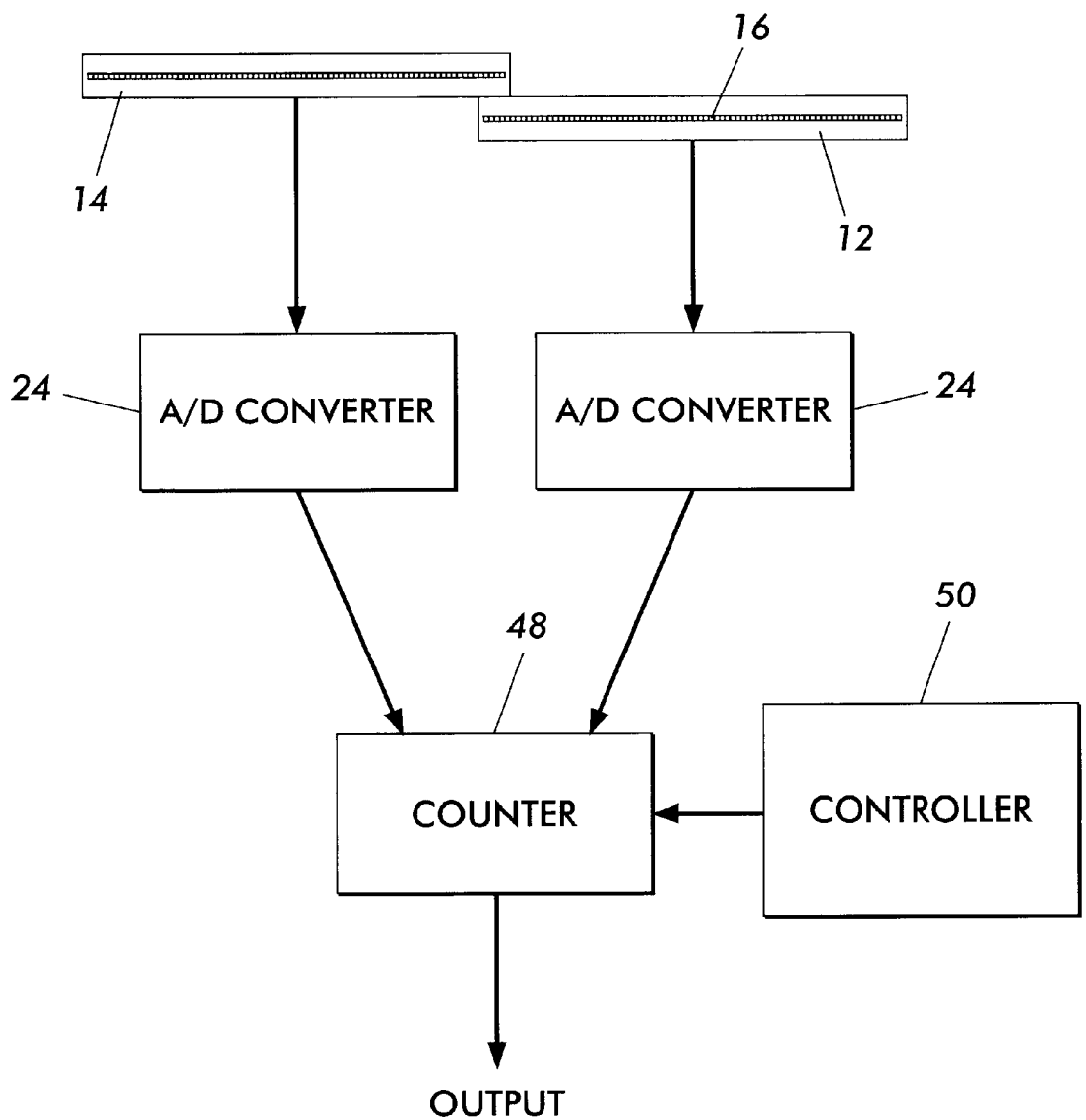
FIG. 3 is an illustration of a scanning system or and image processing system of a preferred embodiment of the present invention.
Figure 7:
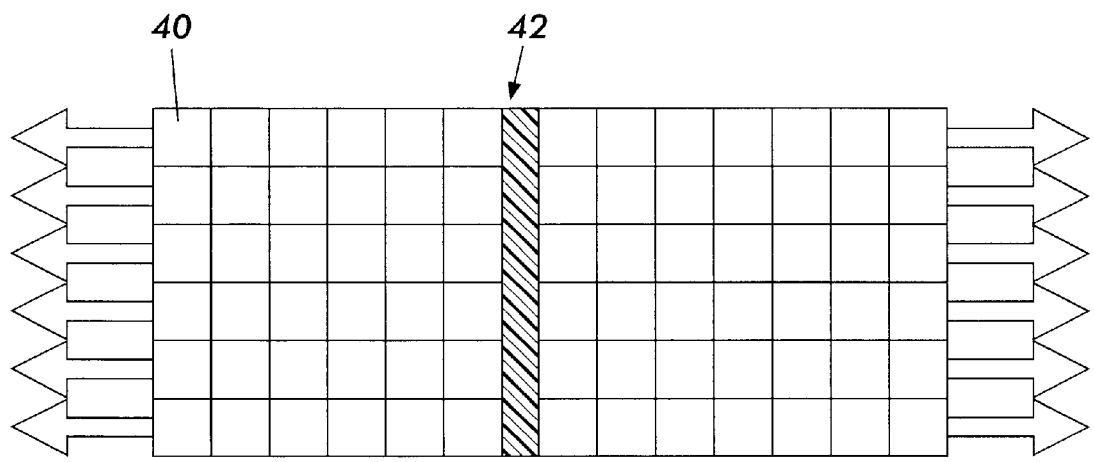
FIG. 7 is an illustration of an image produced without the weighted averaging or a varying of stitch location of the embodiments of the present invention.
Figure 8:
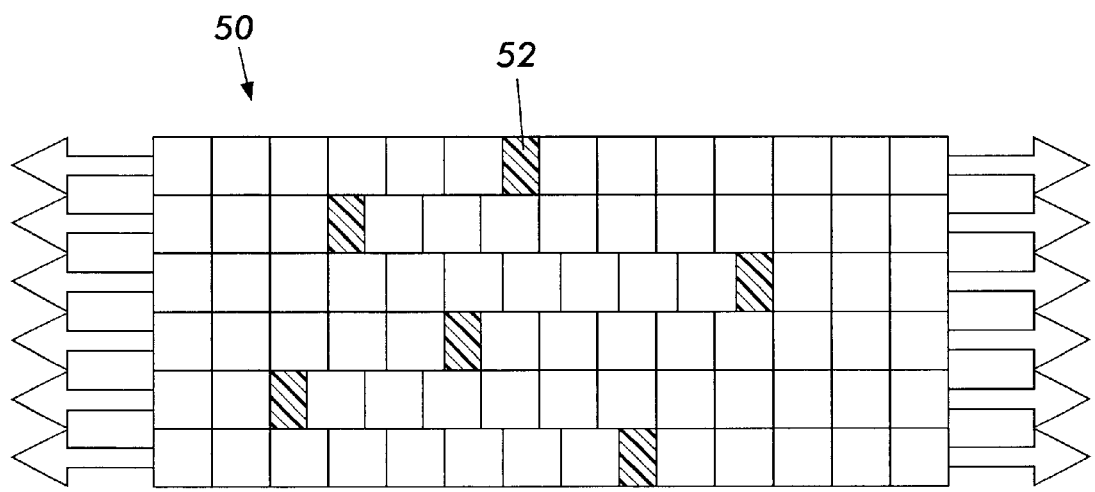
FIG. 8 is an illustration of six scanlines of image data with the variation in stitch location of the present invention.

A further embodiment of the invention uses a slightly different system and method to eliminate undesirable image defects caused by the gap 38 or gap 42 shown in FIGS. 5 and 7, respectively. This embodiment is illustrated in FIG. 3. This embodiment is similar to the embodiment illustrated in FIG. 2 except that instead of controller 26, it includes a counter 48 and controller 50. In this embodiment, the two sensors 14 and 16 feed their analog data to A/D converters 24, which convert the analog data into digital data and output it, in the same manner as the first described embodiment. However, in contrast to the first described embodiment, this preferred embodiment will vary the stitch location from scanline to scanline to produce a resultant image such as image 50 shown in FIG. 8. The image 50 is produced by varying the location of the gap 52 from scanline to scanline to minimize visible effects in the image produced therefrom. Like the first embodiment, the gap 52 is produced due to the misalignment of pixels between overlapped sensors. The gap is produced when the image data is shifted from a first sensor to a second sensor. By varying the location of the gap 52, the visible image defects produced therefrom may be reduced.

Referring again to FIG. 3, the controller 50 controls counter 48 to select one of the outputs from the two A/D converters 24 to vary the location and timing of switching from the first sensor to the second sensor (the stitch location). The counter then outputs the data which results in the image shown in FIG. 8.

Various modifications may be made to the embodiments disclosed and described above without departing from the spirit and scope of the invention set forth in the following claims. For example, in the embodiment shown in FIG. 3, instead of the counter 48 used to vary the timing of switching from the first sensor to the second sensor (the stitch location) one could use any electronic or software means that could vary the location of the gap 52 in the resultant image. For example, a random number generator could be used that could switch the location based on a random value generated therefrom. Additionally, the embodiments of FIG. 2 and FIG. 3 could be used together.

What is claimed is:

1. A multi-sensor scanning system for scanning a document, comprising:
   a plurality of sensors, each of the sensors scanning a portion of the document to produce image data, each of the sensors overlapping adjacent ones of the sensors so that the image data includes overlapped image data,
   a controller that receives the image data from the plurality of sensors and stitches the overlapped image data together to form a complete image by performing a weighted averaging of the overlapped image data; and
   wherein the overlapped image data includes position data and brightness data and the controller performs a weighted averaging of the brightness data from the overlapped sensors.

2. The multi-sensor scanning system of claim 1, wherein the weighted averaging is a linear weighted averaging.

3. The multi-sensor scanning system of claim 1, wherein the weighted averaging is a non-linear weighted averaging.

4. The multi-sensor scanning system of claim 1, wherein pixels in a first one of the sensors overlap pixels in a second one of the sensors in a first direction and the pixels in the first one of the sensors are misaligned with the pixels in the second one of the sensors in a slowscan direction, the first direction being substantially perpendicular to the second direction.

5. An image processing system for processing image data produced from a document, comprising:
   a plurality of sensors, each of the sensors scanning a portion of the document to produce the image data, each of the sensors overlapping adjacent ones of the sensors so that the image data includes overlapped image data;
   a controller that receives the image data from the plurality of sensors and stitches the overlapped image data together to form a complete image by performing a weighted averaging of the overlapped image data; and
   wherein the overlapped image data includes a position data and brightness data and the controller performs a weighted averaging of the position data from the overlapped sensors and performs a weighted averaging of the brightness data from the overlapped sensors.

6. The image processing system of claim 5, wherein the overlapped image data includes position data and brightness data and the controller performs a weighted averaging of the position data from the overlapped sensors and performs a weighted averaging of the brightness data from the overlapped sensors.

7. The image processing system of claim 5, wherein the weighted averaging is a linear weighted averaging.

8. The image processing system of claim 5, wherein the weighted averaging is a non-linear weighted averaging.

9. The image processing system of claim 5, wherein the image processing system is a digital scanner.

10. The image processing system of claim 5, wherein the image processing system is a copier.

11. The image processing system of claim 5, wherein pixels in a first one of the sensors overlap pixels in a second one of the sensors in a first direction and the pixels in the first one of the sensors are misaligned with the pixels in the second one of the sensors in a slowscan direction, the first direction being substantially perpendicular to the second direction.

12. A method of scanning a document with a multi-sensor scanning system having a plurality of sensors, comprising:

scanning a portion of the document with each of the sensors to produce image data, each of the sensors overlapping adjacent ones of the sensors so that the image data includes overlapped image data;

receiving the image data from the plurality of sensors with a controller;

stitching the overlapped image data together to form a complete image by performing a weighted averaging of the overlapped image data; and wherein the overlapped image data includes position data and brightness data and stitching the overlapped image data together to form a complete image by performing a weighted averaging of the overlapped image data comprises performing a weighted averaging of a position data from the overlapped sensors and performing a weighted averaging of the brightness data from the overlapped sensors.

13. The method of scanning a document of claim 12, wherein performing weighted averaging comprises performing a non-linear weighted averaging.

14. The method of scanning a document of claim 12, wherein performing weighted averaging comprises performing a non-linear weighted averaging.

15. A method of processing image data produced from a document with an image processing system having a plurality of sensors, comprising:

scanning a portion of the document with each of the sensors to produce image data, each of the sensors overlapping adjacent ones of the sensors so that the image data includes overlapped image data;

receiving the image data from the plurality of sensors with a controller;

stitching the overlapped image data together to form a complete image by performing a weighted averaging of the overlapped image data; and wherein the overlapped image data includes position data and brightness data and stitching the overlapped image data together to form a complete image by performing a weighted averaging of the overlapped image data comprises performing a weighted averaging of the position data from the overlapped sensors and performing a weighted averaging of the brightness data from the overlapped sensors.

16. The method processing image data produced from a document of claim 15, wherein performing weighted averaging comprises performing a linear weighted averaging.

17. The method of processing image data produced from a document of claim 15, wherein performing weighted averaging comprises performing a non-linear weighted averaging.

18. The method processing image data produced from a document of claim 15, wherein the image processing system is a digital scanner.

19. The method of processing image data produced from a document of claim 15, wherein the image processing system is a copier.

20. The method of processing image data produced from a document of claim 15, wherein pixels in a first one of the sensors overlap pixels in a second one of the sensors in a first direction and the pixels in the first one of the sensors are misaligned with the pixels in the second one of the sensors in a slowscan direction, the first direction being substantially perpendicular to the second direction.

* * * * *